US007107284B1

(12) United States Patent
Betz et al.

(10) Patent No.: US 7,107,284 B1
(45) Date of Patent: Sep. 12, 2006

(54) METHOD OF GENERATING USER CUSTOMIZED DOCUMENT INCORPORATING AT LEAST A PORTION OF DISCOVERY INFORMATION RECORDED IN THE SYSTEM OF RECORD DATABASE IN DATA WAREHOUSE ENVIRONMENT

(75) Inventors: Eugene M. Betz, Toms River, NJ (US); Mahesh P. Vannavada, Edison, NJ (US); Luo-Jen Chiang, Freehold, NJ (US); James E. Thaisz, Lincroft, NJ (US); Karen A. Papierniak, Fenton, MI (US)

(73) Assignee: NCR Corporation, Dayton, OH (US)

( * ) Notice: Subject to any disclaimer, the term of this patent is extended or adjusted under 35 U.S.C. 154(b) by 555 days.

(21) Appl. No.: 09/472,852

(22) Filed: Dec. 28, 1999

(51) Int. Cl.
G06F 17/00 (2006.01)
G06F 17/30 (2006.01)
G06F 15/00 (2006.01)

(52) U.S. Cl. ............... 707/104.1; 707/1; 707/200; 715/513

(58) Field of Classification Search ......... 707/1–10, 707/100–104.1, 200–206, 500.1, 501.1, 511–515, 707/526, 530–531, 900–902; 709/203–205, 709/215–225; 345/968; 705/1–10, 26–27; 715/512–513
See application file for complete search history.

(56) References Cited

U.S. PATENT DOCUMENTS

| 5,559,692 | A |   | 9/1996 | Telingator et al. ...... 364/401 R |
| 5,615,367 | A |   | 3/1997 | Bennett et al. .............. 395/613 |
| 5,659,676 | A |   | 8/1997 | Redpath ...................... 395/777 |
| 5,675,785 | A |   | 10/1997 | Hall et al. ................... 395/613 |
| 5,692,206 | A |   | 11/1997 | Shirley et al. .............. 395/793 |
| 5,701,453 | A |   | 12/1997 | Maloney et al. ............ 395/602 |
| 5,717,923 | A |   | 2/1998 | Dedrick ....................... 395/613 |
| 5,771,379 | A |   | 6/1998 | Gore, Jr. ..................... 395/612 |
| 5,784,562 | A |   | 7/1998 | Diener .................. 395/200.47 |
| 5,812,134 | A |   | 9/1998 | Pooser et al. ............... 345/356 |
| 6,032,158 | A | * | 2/2000 | Mukhopadhyay et al. .... 707/10 |
| 6,035,330 | A | * | 3/2000 | Astiz et al. .................. 345/738 |
| 6,067,523 | A | * | 5/2000 | Bair et al. ...................... 705/2 |
| 6,128,624 | A | * | 10/2000 | Papierniak et al. ...... 707/104.1 |
| 6,151,584 | A | * | 11/2000 | Papierniak et al. ........... 705/10 |
| 6,151,586 | A | * | 11/2000 | Brown .......................... 705/1 |
| 6,163,774 | A | * | 12/2000 | Lore et al. .................... 705/10 |

(Continued)

FOREIGN PATENT DOCUMENTS

CA 2310943 * 12/2001 ................ 17/30

(Continued)

Primary Examiner—Srirama Channavajjala
(74) Attorney, Agent, or Firm—Lowe, Hauptman, Gilman, Berner, LLP

(57) ABSTRACT

The present invention is called a document customizer. The document customizer captures and records changes made to an electronic and/or physical footprint of a data warehouse engagement by a knowledgeable field practitioner. The document customizer starts with a "system-of-record" document which defines the starting system parameters of the data warehouse, as initially delivered to the customer (i.e., Logical Data Model, Physical Data Model, Metadata and system configuration templates). The document customizer allows the practitioner to archive and document the modifications made to the system-of-record and creates an on-line environment to document and time-stamp the modifications made to the data warehouse. The document customizer then creates a "current" system-of-record document. Provisions are included to make additions and modifications to the (new) current document to allow text comments and notes to be input.

21 Claims, 8 Drawing Sheets

U.S. PATENT DOCUMENTS

| | | | |
|---|---|---|---|
| 6,167,405 A * | 12/2000 | Rosensteel et al. | 707/102 |
| 6,178,418 B1 * | 1/2001 | Singer | 370/255 |
| 6,243,703 B1 * | 6/2001 | Couch et al. | 345/841 |
| 6,289,460 B1 * | 9/2001 | Hajmiragha | 713/200 |
| 6,353,840 B1 * | 3/2002 | Saito et al. | 715/517 |
| 6,363,391 B1 * | 3/2002 | Rosensteel, Jr. | 707/10 |
| 6,363,393 B1 * | 3/2002 | Ribitzky | 345/762 |
| 6,654,737 B1 * | 11/2003 | Nunez | 707/3 |
| 6,854,086 B1 * | 2/2005 | Umen et al. | 715/513 |

FOREIGN PATENT DOCUMENTS

| | | | | |
|---|---|---|---|---|
| EP | 0703537 | * | 3/1995 | 17/30 |
| EP | 0706140 | * | 4/1996 | 17/30 |
| EP | 1160715 A2 | * | 12/2001 | 17/60 |
| GB | 2386219 A | * | 9/2003 | 17/21 |

* cited by examiner

FIG. 7

| ITEM NAME | VALUE | START DATE | END DATE | CHANGE MADE BY | REASON FOR CHANGE |
|---|---|---|---|---|---|
| ... | | ... | ... | ... | ... |
| DATA TRANSFER FREQUENCY | WEEKLY, SUNDAYS AT 11:00 AM EST | JANUARY 23, 1998 | AUGUST 1, 1999 | JIM KOPLOSKI | ORIGINAL ISSUE |
| DATA TRANSFER FREQUENCY | BIWEEKLY, SUNDAYS AT 4:00 PM EST | AUGUST 2, 1999 | CURRENT | JANICE STEEN | BILLS ARE GENERATED BIWEEKLY AND 95% OF THE BILLING RECORDS ARE GENERATED AT THIS TIME, THE OTHER 5% ARE UPDATES THAT HAPPEN AT ANYTIME. |
| ... | | | | | |

700 ←
702 —
704 —
710 —

METHOD OF GENERATING USER CUSTOMIZED DOCUMENT INCORPORATING AT LEAST A PORTION OF DISCOVERY INFORMATION RECORDED IN THE SYSTEM OF RECORD DATABASE IN DATA WAREHOUSE ENVIRONMENT

RELATED APPLICATIONS

The present application relates to U.S. Ser. No. 08/975,433 is now U.S. Pat. No. 6,151,584 filed Nov. 20, 1997, entitled "COMPUTER ARCHITECTURE AND METHOD FOR VALIDATING AND COLLECTING METADATA AND DATA ABOUT THE INTERNET AND ELECTRONIC COMMERCE ENVIRONMENTS (DATA DISCOVERER), pending; and U.S. Ser. No. 08/969,082 filed Nov. 12, 1997, is now U.S. Pat. No. 6,128,624 entitled COMPUTER ARCHITECTURE AND METHOD FOR INTEGRATING INTERNET ELECTRONIC COMMERCE AND OPERATIONAL DATABASE DATA INTO WAREHOUSE OF DATABASE", pending, both of which are hereby incorporated by reference in their entirety into this specification.

FIELD OF THE INVENTION

The present invention relates generally to support systems for data warehouse development and maintenance professionals, and more particularly, to a method and system for documenting an electronic and/or physical footprint of an engagement process used in a data warehouse environment.

BACKGROUND OF THE INVENTION

A data warehouse can be used to store vast amounts of information or data including transactional/operational data. Data warehouse professionals including implementers and developers implement and maintain the data warehouse.

Data warehouse professionals also perform processes, referred to as a business data discovery process and a data discovery process, throughout the life of the data warehouse to ascertain the customer specific information/data required to build, run and maintain the data warehouse. The business discovery process is used to identify and record a set of specific customer related business problems. The data discovery process is used to establish customer related data available to solve such problems. The results from the business discovery process and the data discovery process each form an essential foundation of information upon which the data warehouse is built and operated.

During the business discovery process, the data warehouse professional identifies the customer's business goals, objectives, and problems to determine the types of problems that should or can be solved using the data warehouse. The data warehouse professional identifies the nature and availability of all data/information relating to the customer that can potentially serve as a basis for business analysis after being warehoused. The data discovery process is used to identify quantitatively and qualitatively the data sources of the customer's transactional/operational business related data. Data for the data warehouse is typically copied or derived from these data sources.

Exemplary data discovery information includes the types of devices serving as data warehouse data sources and the geographical locations of such devices, who administers the data source devices, the frequency with which the data source devices are updated or backed-up, the logical description of data stored by the data source devices and the access techniques or data transfer methods used to communicate data to and from the data source devices, and the business rationale for using such data (determined from the business discovery process). Data discovery information also includes defining the data or what the data means to the customer. For example, an end date in a billing table could mean the last date of service of the last date the customer was billed or both.

Data warehouse professionals typically perform the business discovery process and the data discovery process through a series of engagements with the customer. An engagement is a personal interaction between the data warehouse professionals and the customer, wherein the data warehouse professional solicits the business discovery information and the data discovery information from the customer and seeks to document relevant, discovered information. An engagement can last up to several months enabling the data warehouse professionals to gather the large amount of discovery data required to build and run a large data warehouse.

During a data warehouse engagement, many interactions occur between the customer and the data warehouse professionals. The information flow between the customer and the data warehouse professionals are intensive and spontaneous. Critical information and learned knowledge which are a result of these engagements may be lost if an automated process is not used to capture the transactions. To the inventors' knowledge, no such tool exists for documenting the engagement process used in creating and maintaining the data warehouse.

SUMMARY OF THE INVENTION

It is therefore an object of the present invention to provide a method and apparatus for capturing and recording changes made to an electronic and/or physical footprint during a data warehouse engagement.

It is another object of the present invention to document changes made to the starting system parameters of the data warehouse.

Another object of the present invention is to provide a document customizer for establishing a system of record document defining the system parameters of the data warehouse and to record the footprint and associated changes or content and process as a data warehouse professional interacts with a customer.

The present invention is called a document customizer. The document customizer captures and records changes made to an electronic and/or physical footprint of a data warehouse engagement by a knowledgeable field practitioner. The document customizer starts with a "system-of-record" (SOR) document which defines the starting system parameters of the data warehouse, as initially delivered to the customer (i.e., Logical Data Model, Physical Data Model, Metadata and system configuration templates). The document customizer allows the practitioner to archive and document the modifications made to the system-of-record and creates an on-line environment to document and time-stamp the modifications made to the data warehouse. The document customizer then creates a "current" system-of-record document. Provisions are included to make additions and modifications to the (new) current document to allow text comments and notes to be input. The knowledge captured via the engagement is vital data for both the customers' data warehouse administrator and the knowledgeable field practitioner. The customer benefits from understanding the modifications made to their data warehouse for future design changes, performance enhancements and troubleshooting needs. The knowledgeable field practitioner may now keep an archive of the customers' data warehouse to assist in quoting the cost of additional changes to the warehouse, while gaining a competitive edge in supporting the customer through knowledge gained, by knowing what modifications were made to the system, to date. The document customizer can be implemented in both standalone and networking manners using a Graphical User Interface—Windows and/or Web based. Document customizer provides the easy to use vehicle and interface to allow the instant capture of the ideas and information. These types of ideas and information usually include, but are not limited to, the data field descriptions, source data locations, relevant documents, critical customer files, Metadata and reports. Document customizer organizes, manipulates and presents the information such that the final output of the document customizer is a useful guide for users to perform the tasks.

In accordance with the present invention, discovery data for a data warehouse is solicited from a data warehouse customer using an orderly, predefined sequence of queries generated by a computer from an organized, configuration controlled set of query templates. The query templates and answers to the queries form the basis of an organized, centrally available, data warehouse system-of-record defining the data and data sources for the data warehouse, and business rules and/or rationales for using the data from the data sources. The present invention advantageously flags missing discovery information based on a comparison between the predefined sequence of queries and the order in which the queries are answered by the customer. Discovery information, in such different formats as text, audio, and video formats, can be imported automatically into the system-of-record and linked to the templates. Additionally, customized documents incorporating discovery information from the system-of-record, including the imported text, audio and video base information, can be generated using the present invention. The customized documents incorporate discovery information in user selected arrangements and formats.

These and other objects of the present invention are achieved by a computer implemented method of capturing and recording changes to an electronic and/or physical footprint of a data warehouse. A user is solicited for data discovery information defining data and sources of the data for a data warehouse. At least a portion of the footprint of the data warehouse is in an SOR document database using the discovery information collected from the user as a result of said soliciting step. A user customized document is generated incorporating at least a portion of the discovery information recorded in the SOR database.

Still other objects and advantages of the present invention will become readily apparent to those skilled in the art from the following detailed description, wherein the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

FIG. 7 is an illustration of a portion of the exemplary system-or-record document of FIG. 3 after being updated.

BEST MODE FOR CARRYING OUT THE INVENTION

A method of and apparatus for documenting an electronic and/or physical footprint of an engagement process for data warehouse environment are described. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Figure 1:
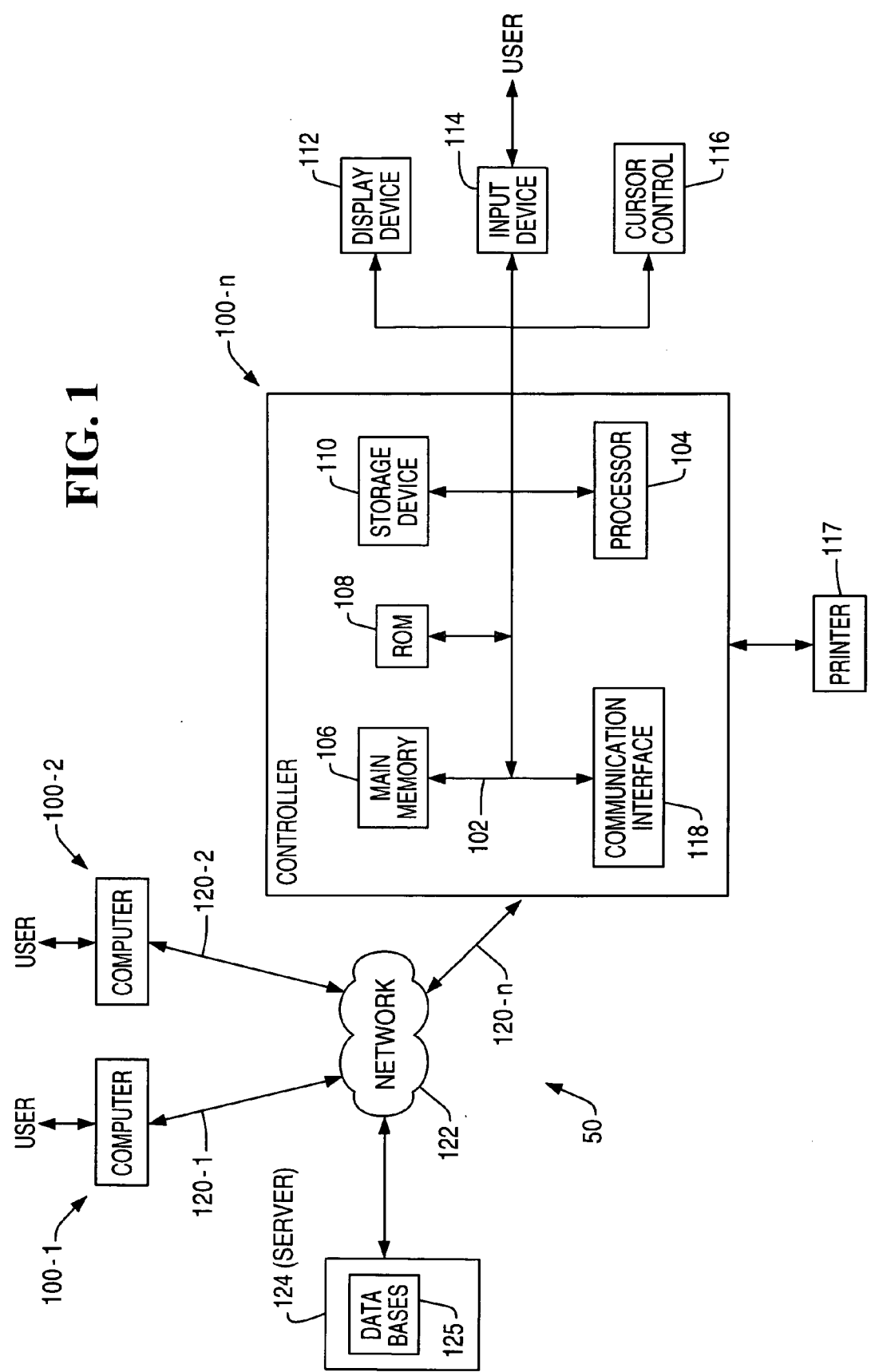
FIG. 1 is a high level block diagram of an exemplary computer network and an exemplary computer system with which the present invention can be implemented.

FIG. 1 is a block diagram illustrating an exemplary computer network 50 in which an embodiment of the invention may be implemented. The present invention is usable with currently available personal computers, mini-mainframes and the like. A plurality of computers 100-1, 100-2, 100-3 . . . 100-*n* are depicted each connected to a network 122 via connections 120-1, 120-2, 120-3 . . . 120-*n* respectively which in turn is connected to a server 124 having databases and or data warehouses 125.

Computer 100-*n* is representative of the other computers 100-1, 100-2 . . . and is described in detail herein. Computer system 100-*n* includes a bus 102 or other communication mechanism for communicating information, and a processor 104 coupled with the bus 102 for processing information. Computer system 100-*n* also includes a main memory 106, such as a random access memory (RAM) or other dynamic storage device, coupled to the bus 102 for storing information and instructions to be executed by processor 104. Main memory 106 also may be used for storing temporary variables or other intermediate information during execution of instructions to be executed by processor 104. Computer system 100-*n* further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions.

Computer system 100-n may be coupled via the bus 102 to a display 112, such as a cathode ray tube (CRT) or a flat panel display, for displaying information to a computer user. An input device 114, including alphanumeric and other keys, is coupled to the bus 102 for communicating information and command selections to the processor 104. Another type of user input device is cursor control 116, such as a mouse, a trackball, or cursor direction keys for communicating direction information and command selections to processor 104 and for controlling cursor movement on the display 112. Computer system 100-n can generate printed output on a printer 117 coupled with the computer system 100-n.

The invention is related to the use of a computer system 100-n, such as the illustrated system, to display graphical interface icons, text, images, and the like relating to business and data discovery processes relating to a data warehouse, and to accept commands and data from a user. According to one embodiment of the invention, business and data discovery information and display is provided by computer system 100-n in response to processor 104 executing sequences of instructions contained in main memory 106. Such instructions may be read into main memory 106 from another computer-readable medium, such as storage device 110. However, the computer-readable medium is not limited to devices such as storage device 110. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 106 causes the processor 104 to perform the process steps described below. In alternative embodiments, hard-wired circuitry may be used in place of or in combination with computer software instructions to implement the invention. Thus, embodiments of the invention are not limited to any specific combination of hardware circuitry and software.

Computer system 100-n also includes a communication interface 118 coupled to the bus 102. Communication interface 118 provides a two-way data communication as is known. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals which carry digital data streams representing various types of information. Of particular note, the communications through interface 118 may permit transmission or receipt of the business and data discovery related information stored in a remote data base, as will be described. For example, two or more computer systems 100 may be networked together in a conventional manner with each using the communication interface 118.

Each computer system 100-1, 100-2 . . . 100-n is linked to a network 122 by a corresponding network link 120-1, 120-2 . . . 120-n. Each network link 120-1, 120-2 . . . 120-n provides data communication through one or more networks to other data devices. For example, each network link 120 may provide a connection through network 122 to a networked server 124 for storing business and data discovery related information in one or more centrally accessible databases and/or data warehouses 125. Databases 125 are centrally accessible because all computer systems 100-1, 100-2 . . . 100-n have network access to databases 125.

Network 122 represents, for example, a local area network, a company Intranet, the world wide packet data communication network now commonly referred to as the "Internet", any other suitable communication network, or a combination of such networks. Network 122 uses electrical, electromagnetic or optical signals carrying digital data streams. The signals through the various networks and the signals on network link 120 and through communication interface 118-1, 118-2 . . . 118-n, which carries the digital data to and from computer systems 100-1, 100-2 . . . 100-n respectively, are exemplary forms of carrier waves transporting the information.

Each computer system 100 can send messages and receive data, including program code, through the network(s), network link 120 and communication interface 118. In the Internet or Intranet example, computer 100 might transmit a request for a business and data discovery information file to server 124 through communication interface 118 and network 122. In response, server 124 downloads the requested file to computer system 100 via network 122. The received file may be stored in storage device 110, or other non-volatile storage for later access.

Figure 2:
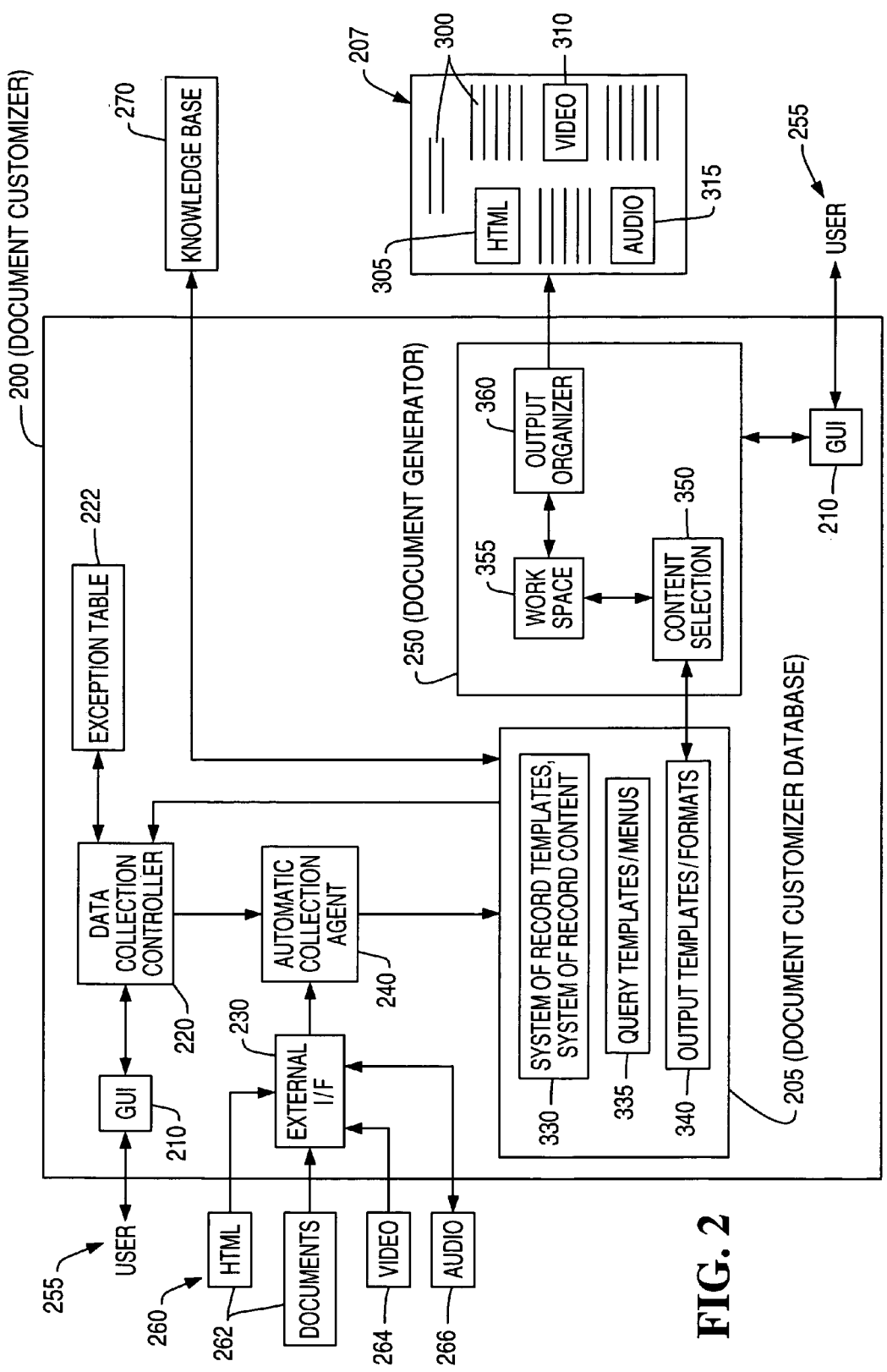
FIG. 2 is a logical architecture of a document customizer in accordance with the present invention.

FIG. 2 is an illustration of a logical architecture 200 of a document customizer program of the present invention and the inputs to the document customizer and the outputs from the document customizer. Document customizer 200 provides data warehouse professionals with a unique tool for capturing, documenting and maintaining business and data discovery data for a data warehouse, and for generating customized output documents incorporating the discovery information. The logical components of document customizer 200 can execute on any of computer systems 100-1, 100-2 . . . 100-n of FIG. 1.

Data warehouse professionals can use document customizer 200 during the business discovery process and the data discovery process as a tool for automatically recording such discovery information in a document customizer database 205 in a standardized format. Also, data warehouse professionals advantageously use document customizer 200 as a mechanism for maintaining centralized, configuration control over the discovery information recorded in document customizer database 205, and for generating a customized document 207 incorporating the recorded discovery information. Data warehouse professionals use such customized documents in building and maintaining the data warehouse.

Document customizer 200 includes the document customizer database 205, a graphical user interface (GUI) 210 displayed on the display device 112, a data collection controller 220, an exception table 222, an external interface (I/F) 230, an automatic collection agent 240, and a document generator 250. A user 255 participates with document customizer 200 through GUI 210 using the display device 112. A plurality of external information sources 260 can be imported into document customizer 200 in a known manner using external I/F 230 which interfaces with communication interface 118. External I/F 230 imports different types of data including textually based files 262, image data such as that provided by computer aided design packages, still and motion video data 264, and audio data 266, i.e., multimedia data. Also, document customizer 200 can download data from and upload data to the databases 125 on server 124.

User 255 generates the customized document 207, incorporating discovery information recorded in database 205, using document generator 250 of document customizer 200. An exemplary document 207 can include text portions 300, HTML pages 305, a video portion 310 and an audio portion 315, corresponding respectively, for example, to externally supplied discovery data items 262, 264 and 266.

GUI 210 supports a number of user selectable interactive environments, including, for example, a windowing environment, and a hypertext mark-up language (HTML) browser for Internet and Intranet environments, as is known. Data collection controller 220 provides information to and accepts information from GUI 210, and uses information stored in database 205 to supervise user interaction with document customizer 200 through GUI 210. Data collection controller 220 also supervises error or exception handling during the process of soliciting for discovery information from user 255. When an error occurs during the solicitation process, controller 220 generates an exception and stores the exception in exception table 222 residing in document customizer memory, such as memory 106. Collection agent 240 routes the discovery information collected or imported via GUI 210, collection controller 220 and external I/F 230, to database 205.

The document customizer 200 is used to record discovery information in a sub-component of database 205 referred to as a system-of-record document (SOR) 330. SOR 330 includes a template 410 (described later with reference to FIG. 3) and "content" for a given data source used in creating and updating the data warehouse. Advantageously, the use of SOR templates permit each of the data sources for the data warehouse to be recorded in a consistent, standardized format. The templates organize the recording of the discovery data or content for any given data warehouse into a series of information structures collectively defining SOR 330.

Document customizer database 205 includes a plurality of system of record documents 330 each including a template column 410 and a content column 415 (see FIG. 4), a query templates/menus 335, and an output templates/formats 340. The discovery data query templates/menus 335 are accessible to data collection controller 220. Data collection controller 220 and GUI 210 use the query templates/menus 335 in conjunction with the templates 410 of SOR 330 to build user menus and graphical icons for soliciting discovery information from the customer via GUI 210. Similarly, document output templates/formats 340 are accessible to document generator 250 and are used by the document generator 250 for generating documents from SOR 330 in user selected formats.

Centralized knowledge base 270 external to document customizer 200 and residing in, for example, databases 125 of server 124 (see FIG. 1), includes the most recently developed SOR templates, query templates and menus, and output templates and formats for database 205. Such information can be transferred from knowledge base 270 to database 205 whenever necessary to ensure document customizer database 205 includes current information. Similarly, SOR 330 for a given data warehouse can be uploaded to knowledge base 270 to establish a centrally accessible SOR 330 for that data warehouse. In other words, each document customizer 200-1, 200-2 . . . 200-n can be synchronized with the knowledge base 270.

Document customizer 200 also provides a convenient alternative to soliciting for discovery information. As mentioned above, document customizer 200 can import discovery information from external sources 260 using external I/F 230 and collection agent 240. Such information includes the text based files 262, image data such as that provided by computer aided design packages, the still and motion video data 264, and the audio data 266. Textually based files include formats such as HTML, Wordperfect, MS Word, and Excel. Video data includes data compatible with known formats, such as MPEG, Apple QuickTime, etc.

The document generator 250 includes a content selection controller 350 for extracting desired SOR templates and content from SOR 330 in response to commands entered by user 255 through GUI 210. Content selection controller 350 places such extracted items into a workspace area 355 in document customizer memory, such as memory 106. An output organizer 360 supervises the display of the desired items in workspace 355 in accordance with user specified output formats. Also, user 255 can edit and arrange the data in workspace 355 via GUI 210 and output organizer 360, to thereby construct a final, customized document suitable for output. In other words, document organizer 250 permits user 255 to visualize and rearrange selected discovery data from the SOR 330, in order to generate a customized output document incorporating the selected discovery information.

Figure 3:
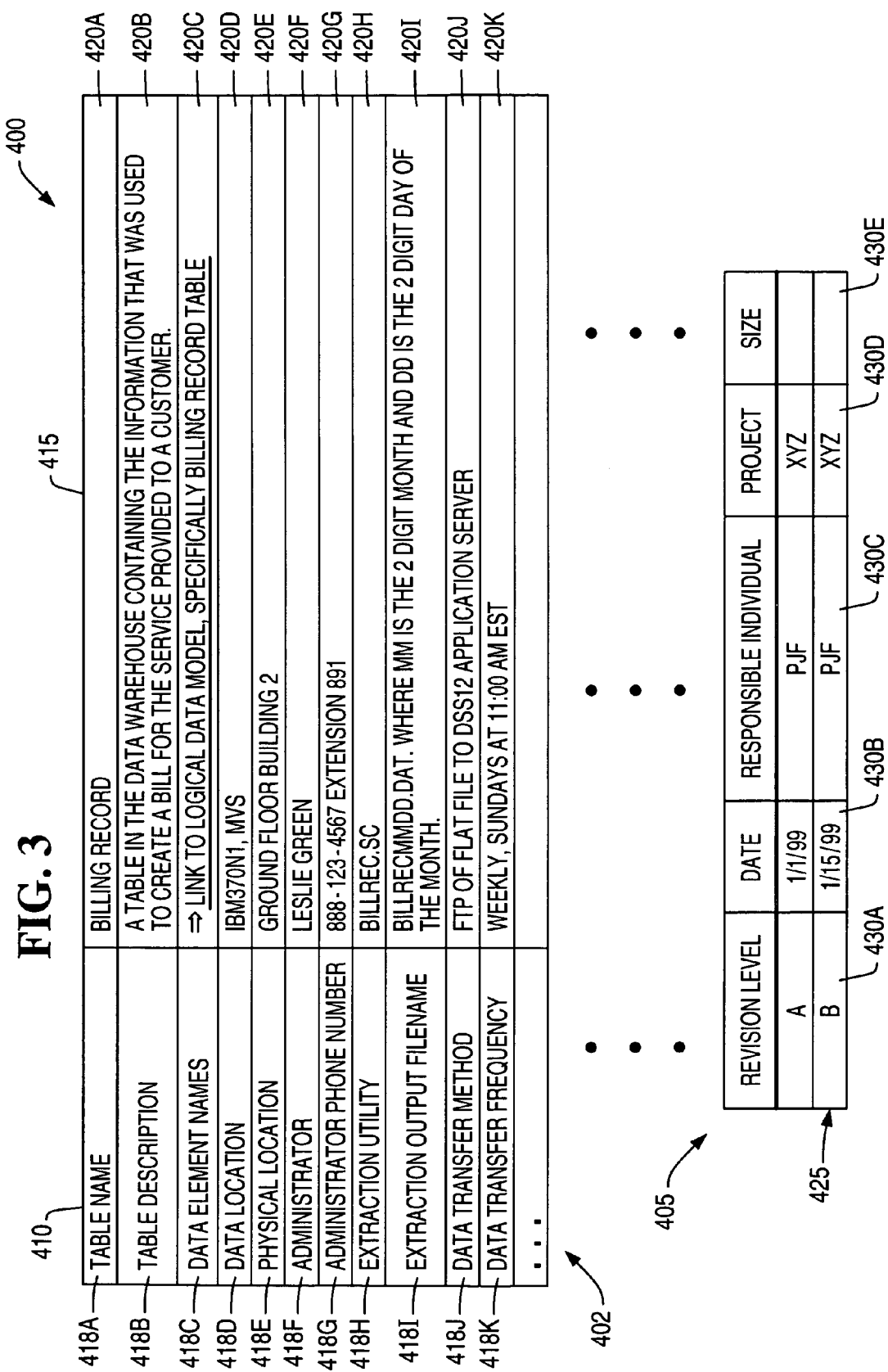
FIG. 3 is an illustration of a portion of an exemplary system-of-record document for a data warehouse in accordance with the present invention, generated using the document customizer of FIG. 2.

FIG. 3 is an illustration of portions of an exemplary SOR document 400, including an information table 402 and a configuration control table 405. Information table 402 includes exemplary information relating to billing records that are to be stored in a data warehouse as collected from one or more data sources. As depicted, column 410 is a template including descriptions for each record (row) of column 410. Each entry in column 410 is the content or data to be collected during the data discovery process. These record descriptions collectively form the SOR template column 410. The template column of SOR document 400 is a set of predefined, but extendable, columns used to collect the discovery information, and thus form the basis for standardizing the discovery collecting, recording, and document generating processes, as will be described later. Each different SOR document is likewise extendable. Completed SOR templates contain the descriptions, locations, and detailed information (i.e., content) about the discovery data and processes needed to load the discovery data into the data warehouse.

The content column 415 of document 400 is the template for obtaining content in column 415. Content column 410 represents the discovery information collected by, for example, a data warehouse professional during an engagement with a customer. The content column can contain default values to be used as a guide during the engagement.

With reference to document 400, column 410 includes the following template entries: Table Name 418A; Table Description 418B; Data Element Names 418C; Data Location 418D; Physical Location 418E; Administrator 418F; Administrator Phone Number 418G; Extraction Utility 418H; Extraction Output Filename 418I; Data Transfer Method 418J; and Data Transfer Frequency 418K.

The content column 415 includes the following entries for a data source for billing records: names 420A of source databases and source files providing a source of data to the data warehouse; descriptions 420B of the source databases and files; logical data models 420C of the source databases and files and of the data residing in the databases and files; locations of the source databases and files including an identifier 420D of the type of device wherein the source database and files reside and geographical locations 420E of the devices; names 420F and contact information 420G relating to administrators of the source databases and files; extraction utility information 420H and extraction output file names 420I; updating frequency of the source databases and files (not shown in FIG. 3); and data transfer methods 420J and frequencies 420K for the source databases and files.

The document 400 also includes the configuration control table 405 indicating the revision history of the document 400 and thus enabling data warehouse professionals to track the evolution of the document 400. For each engagement resulting in an update to any SOR documents 400 in SOR 330, document customizer 200 populates a configuration record (row) 425 for each particular document 400 in configuration control table 405 with configuration control items, including, for example, a revision level 430A, a calendar date 430B, the name of a responsible individual 430C, a project identifier 430D, and the current size 430E of SOR 330. Configuration control table 405 can be expanded to include additional configuration control items as needed.

Figure 4:
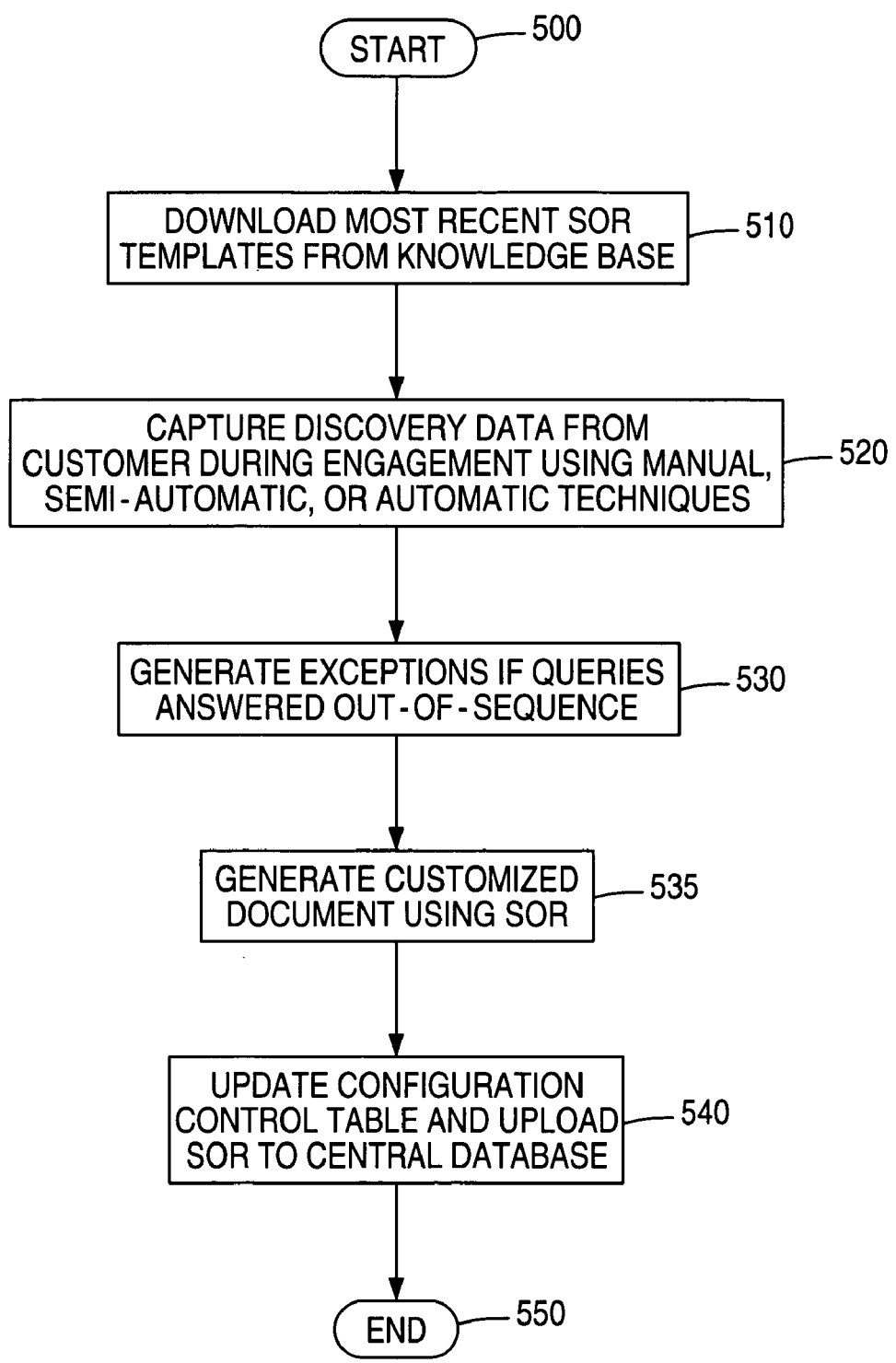
FIG. 4 is a high level flow chart of the sequence involved in using the document customizer in accordance with the present invention.

FIG. 4 is an illustrative sequence of method steps performed using document customizer 200 to establish and document each document 400 in the SOR 330 for a data warehouse. The method begins at step 500 with a decision to either build a new or update an existing SOR 330; the method steps depicted in FIG. 4 apply equally to either case.

At step 510, the most current information available in knowledge base 270 is downloaded to document customizer database 205, as described above.

Next, at step 520, discovery information is captured from the customer during an engagement using one or more of the following collection techniques: a manual collection technique, a semi-automatic collection technique, and an automatic collection technique. The manual technique involves providing hard-copy query forms to the customer, the semi-automatic technique includes a computerized solicitation process, and the automatic technique involves importing external discovery data 260 into document customizer 200. The semi-automatic and automatic collection techniques are now described in sequence.

User 255 solicits and records discovery data from the customer in an organized, standardized manner using document customizer 200. Using the semi-automatic collection technique, GUI 210 presents to user 255 a menu driven, hierarchical sequence of discovery data queries requiring discovery data answers, to thereby step user 255 logically through the discovery solicitation process. Data collection controller 220 accesses and links together the SOR templates 410 in SOR 330, and the query templates and menus resident in database 205 to create a top-down, standardized query outline. Data collection controller 220 submits the query outline to GUI 210.

In turn, GUI 210 presents the query outline, that is, the queries, to the user in a viewable format, including fields for accepting user inputs in the form of responses to the queries. GUI 210 accepts the user inputs and passes the input data to automatic collection agent 240 via collection controller 220. In turn, automatic collection agent 240 populates the associated SOR template with the input data—which becomes SOR content—and in this way, SOR 330 is established.

Data collection controller 220 imposes a set of rules for soliciting discovery data using the query outline. Although user 255 has the freedom to traverse the query outline in the manner the user sees fit, at step 530 of the method of FIG. 4, data collection controller 220 generates and records in exception table 222 exceptions or flags associated with unanswered queries whenever user 255 fails to answer queries in the predetermined order in which the queries are presented. Each time user 255 begins discovery using document customizer 200, controller 220 accesses exception table 220 to determine whether exceptions exist. If exceptions exist, controller 220 presents a list of the exceptions and associated unanswered queries to user 255, as a reminder to discover the missing information. Such query sequencing and exception handling results in a consistent discovery process and consistently populated documents 400 in SOR 330, as between different discovery engagements, and from data warehouse to data warehouse.

The following example serves to illustrate the above mentioned exception handling. Initially, GUI 210 presents a main menu to user 255, followed by a sequence of queries in outline form. In this example, Billing record template 410 of table 400 (see FIG. 3) represents the sequence of queries, while the content 415 of table 400 represents the answers to the queries. Traversing the template based queries in the vertical direction, user 255 is required to enter information such as the logical definition 420C and geographical location 420E of the data source, before entering, for example, the data transfer frequency 420K.

If user 255 jumps ahead and answers the query requesting data transfer frequency 420K before answering the preceding queries, data collection controller 220 generates and records in table 222 an exception indicating that the user failed to answer the queries in the predefined order in which the queries were presented. The exception is linked to each of the unanswered preceding queries, e.g., logical definition 420C and geographical location 420E, and any other intervening queries. An exception can also be generated when a table has been updated (FIGS. 6, 7 and 8), but a related table was not. For example, if a data transfer method is updated and the application server name was changed then an application server data element in a server table may also need to be updated.

Using the automatic collection technique, external I/F 230 accepts externally supplied discovery data 260, and then transmits the data to automatic collection agent 240. Automatic collection agent 240 stores the externally supplied data to database 205 and links the external data to one or more appropriate SOR templates. Such linking causes the external data to be accessible to the user when the associated SOR template is accessed by the user. For example, if the external data is an MS Word business report relating to billing records, agent 240 links the MS Word report to billing record table 400, depicted in FIG. 3. SOR 330 thus encompasses the SOR templates and content described with reference to FIG. 3, as well as the externally supplied discovery data 260. This additional mechanism for accepting and recording externally provided discovery data is convenient and efficient because, often, pertinent discovery data is already documented in the form of business reports, maps or images representing the physical distribution of a customer's data sources (e.g., servers), and diagrams of logical data structures of the data stored in the customer's computers.

Next, at step 535, user 255 can generate a customized document (e.g., document 207) using document generator 250, as will be described below.

Next, at step 540, document customizer 200 updates configuration control table 405, and uploads SOR 330 to knowledge base 270, to thereby establish a current, configuration controlled, centralized record of SOR 330. The process ends at step 550.

Figure 5:
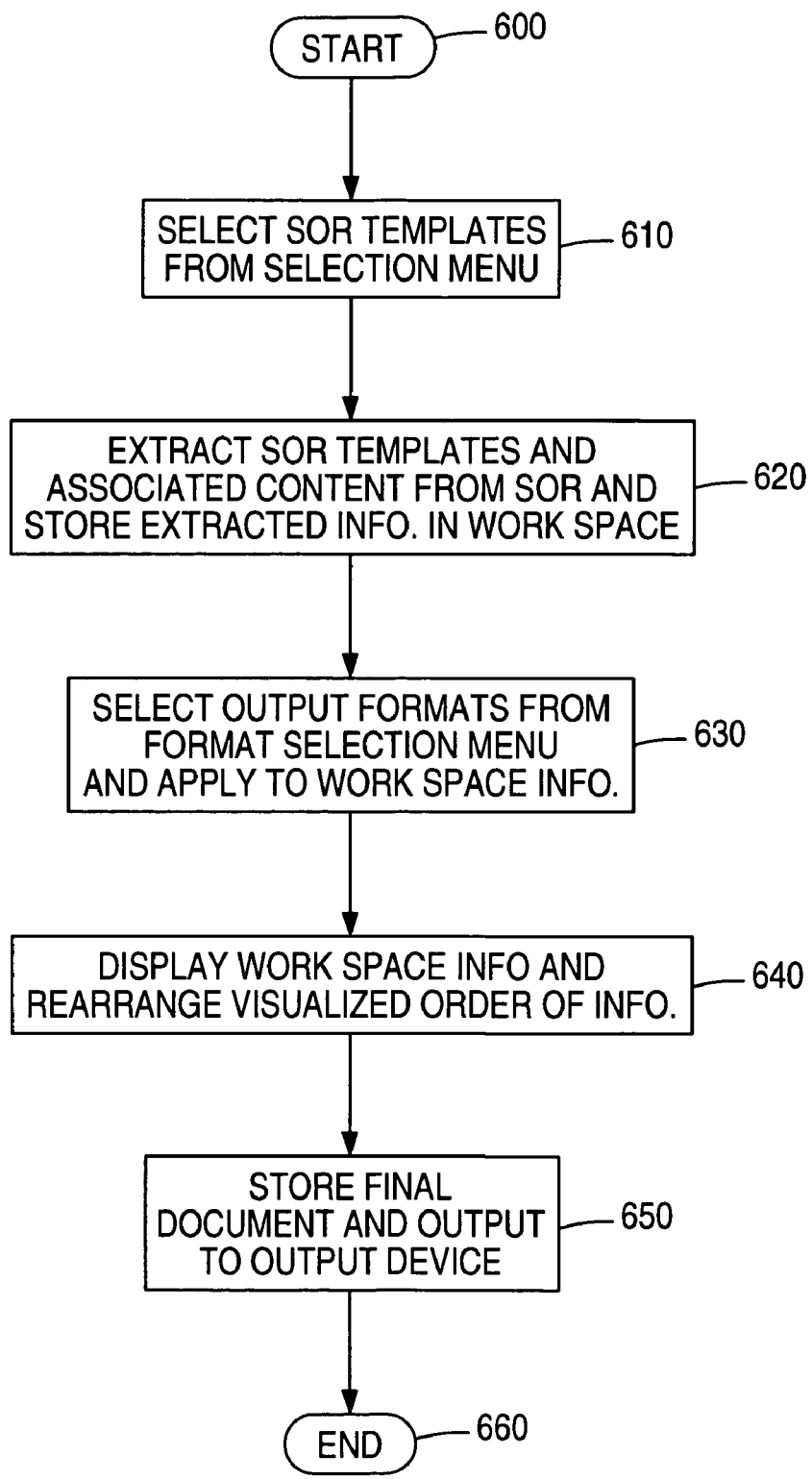
FIG. 5 is a detailed flow chart of the sequence involved in generating a customized document using the document customizer in accordance with the present invention.

A detailed sequence of method steps performed in generating a document using document customizer 200, step 535 above, is depicted in FIG. 5. The process begins at step 600 when user 255 activates document generator 250 from a document customizer 200 main control menu (displayed to user 255 via GUI 210).

Next, at step 610, user 255 identifies and selects those portions of document 400 which are to be incorporated into output, such as document 207. User 255 selects identified portions of document 400 by selecting one or more SOR templates from a hierarchical menu of SOR templates displayed to the user.

Next, at step 620, content selection controller 350 extracts the selected SOR templates and associated content from SOR 330, and loads the extracted information into workspace 355. Output organizer 360 and GUI 210 display the extracted information to user 255 in a raw, textual format, to thereby enable user 255 to visualize the extracted information in workspace 355.

Next, at step 630, user 255 selects desired output formats for the discovery information in workspace 355. Specifically, user 255 chooses one or more output formats from SOR database 330, and associates the selected output formats with selected portions of the discovery information visualized in workspace 355. Output formats residing in database component 310 include industry standardized format definitions, such as definitions for MS Word, Wordperfect, Powerpoint, and multimedia (video and audio) formats, as well as customized formats defined apriori by the user and stored to database component 310 as a customized output format.

In an exemplary sequence of steps corresponding to step 630, user 255 first highlights portions of visualized text in workspace 355, and then associates an output template format with the highlighted text portions by selecting the desired format, such as MS Word, WordPerfect, HTML or XML, from a displayed menu or list of output template formats residing in database component 310.

Next, at step 640, if desired, user 255 rearranges visualized information in workspace 355 using any known technique, such as a "highlight text, then drag-and-drop" technique similar to that used in MS Word. In this manner, different portions of SOR 330 can be arranged by user 255 in any desired order. For example, textual and tabulated information can be positioned above multimedia items, etc.

After user 255 arrives at a desired, visualized arrangement of the information residing in workspace 355, at step 650, user 255 can command document customizer 200 to store the final, customized document residing in workspace 355 in a file. User 255 can also output the customized document to a printer or any other output device compatible with the output formats defined for the document, such as a multimedia output device (e.g., display and speaker of a personal computer). The process ends at step 660 when user 255 deactivates document generator 250.

Figure 6:
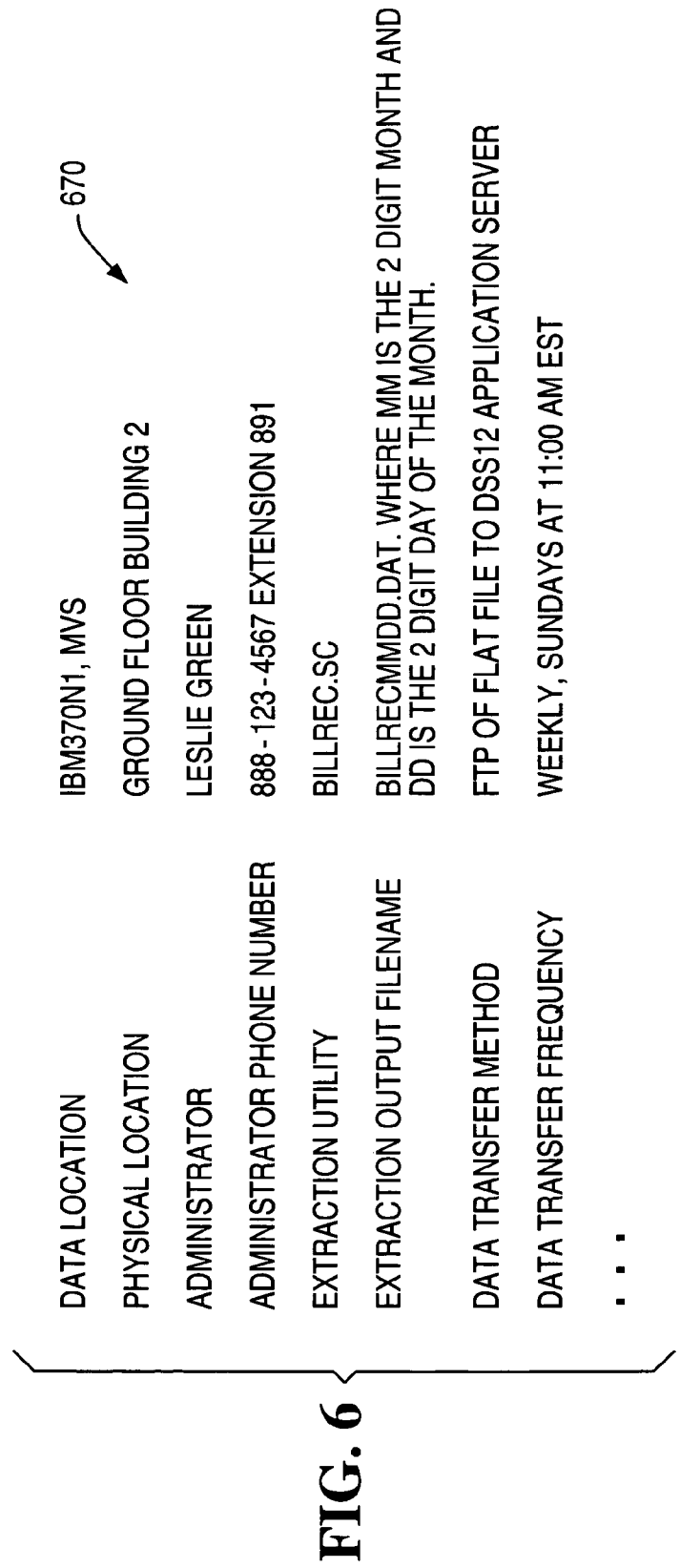
FIG. 6 is an illustration of an exemplary customized report generated using the document customizer of FIG. 2.

An exemplary text based document or report 670 generated by document customizer 200 is depicted in FIG. 6. Document 670 incorporates the template and discovery information (content) represented in table 400 of SOR 330 (see FIG. 3).

FIG. 7 represents an expanded portion 700 of table 400, namely, the "Data Transfer Frequency" record, after user 255 updates the document with new discovery information. Portion 700 includes the original Data Transfer Frequency information record 702, and a new Data Transfer Frequency record 704. The reason for the update is also captured in a "Reason for Change" field 710 of record 704.

Figure 8:
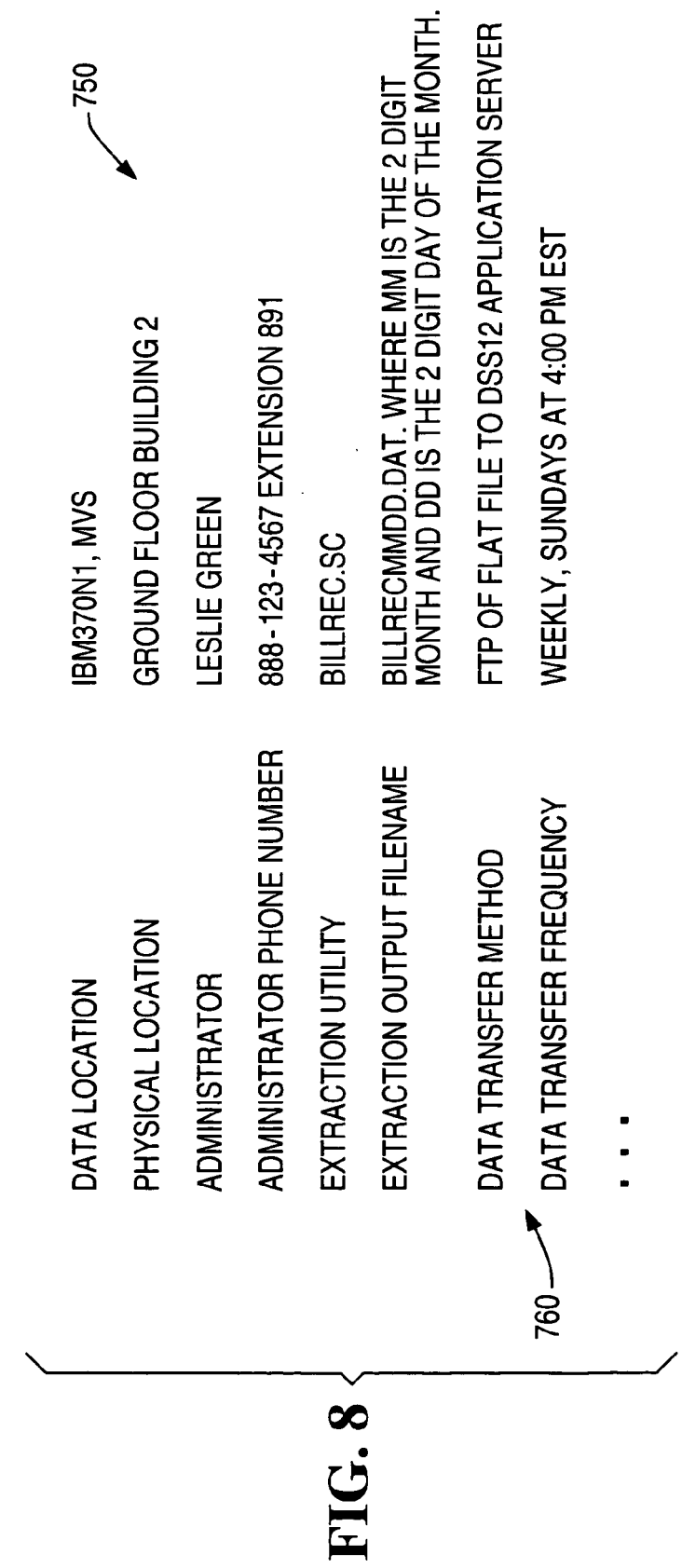
FIG. 8 is an illustration of a customized report corresponding to the updated document of FIG. 7.

In FIG. 8, there is depicted a text based document 750 generated by document customizer 200 after the above mentioned update of the Data Transfer Frequency field, wherein the last printed entry 760 reflects the new Data Transfer Frequency residing in record 704 of portion 700.

It should now be apparent that a method and apparatus for documenting an electronic and/or physical footprint of an engagement process used in a data warehouse environment has been described. The present invention establishes a system of record document defining the system parameters of the data warehouse and records the footprint and associated changes or content and processes as a data warehouse professional interacts with a customer.

It will be readily seen by one of ordinary skill in the art that the present invention solicits for, collects and records discovery information in a standardized, organized manner, to produce a centrally accessible, configuration controlled system-of-record database for a data warehouse. The present invention also generates a customized document based on the system-of-record. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A computer implemented method of capturing and recording changes to an electronic data warehouse or data mart, comprising:

soliciting a user for data discovery information defining data and sources of the data for a data warehouse or data mart;

documenting at least a portion of the data warehouse or data mart in an SOR (System of Record) document using the discovery information collected from the user as a result of said soliciting step; and generating a user customized document incorporating at least a portion of the discovery information recorded in the SOR database.

2. The method of claim 1, further comprising the steps of presenting a predefined sequence of queries for the discovery information to the user based on a set of predefined templates stored in the SOR database; and associating user provided answers to the queries with respective ones of the templates.

3. The method of claim 2, further comprising the steps of generating an exception when the user answers a query out-of-sequence with the predefined sequence of queries and thereby creates at least one unanswered query; and storing the exception in an exception table and associating the exception with the at least one unanswered query.

4. The method of claim 3, further comprising the step of presenting a list of exceptions and associated unanswered queries to the user, to thereby inform the user of the need to collect further discovery information and record the further discovery information in the SOR database.

5. The method of claim 1, wherein said step of generating a customized document includes the further steps of:

extracting a selected portion of the SOR database from the SOR database and storing the extracted portion in a computer memory workspace;

visualizing the extracted portion residing in the workspace on a computer display; and customizing an order of presentation and an output format of the visualized, extracted portion residing in the workspace.

6. The method of claim 5, wherein the SOR database includes templates wherein said generating step includes the further steps of:
  presenting a list of the SOR templates to the user;
  selecting one or more of the SOR templates from the list of SOR templates; and
  extracting the selected templates and associated discovery information from the SOR database to establish the extracted portion of the SOR database in the workspace.

7. The method of claim 6, wherein the SOR database includes predefined output formats associated with generating the customized document, and wherein said generating step includes the further step of formatting the extracted portion in accordance with the output formats.

8. The method of claim 7, further comprising the steps of presenting a list of the output formats to the user;
  selecting one or more of the output formats from the list of output formats; and
  associating the selected output formats with a portion of the extracted portion of the SOR database in the workspace.

9. The method of claim 8, wherein said associating step includes the step of selecting a visualized portion of the extracted portion of the SOR database, the selected, visualized portion being associated with one of the selected output formats.

10. The method of claim 5, wherein said customizing step includes the step of rearranging the order of visualized portions of the extracted portion of the SOR database residing in the workspace.

11. The method of claim 1, wherein the discovery information included in the SOR document includes at least one of:
  names of source databases and source files providing a source of data to the data warehouse;
  descriptions of the source databases and files;
  logical data models for the source databases and files and for the data residing in the databases and files;
  locations of the source databases and files including an identifier of the type of device wherein the source database and files reside and geographical locations of the devices;
  names and contact information relating to administrators of the source databases and files;
  updating frequency of the source databases and files;
  data transferring methods and frequencies for the source databases and files;
  volatility rules for the data in the source databases and files; and
  business rationales for using the data from the source databases and files in the data warehouse.

12. The method of claim 1, further comprising the steps of
  importing discovery information, in the form of at least one of data files and multimedia data, from sources external to the computer into a memory of the computer; and
  linking the imported discovery information to related discovery information in the SOR database, whereby the imported discovery information is accessible to the user with the related discovery information.

13. The method of claim 1, further comprising the step of recording configuration control information in the SOR database each time the SOR database is updated with discovery information.

14. The method of claim 1, further comprising the step of uploading the SOR database to a database residing in a network accessible computer.

15. The method of claim 1, wherein the SOR database includes an SOR document that defines the starting system parameters of the data warehouse.

16. The method of claim 15, wherein the starting system parameters include a logical data model, a physical data model, Metadata and system configuration templates.

17. The method of claim 1, further comprising updating the SOR database including modifications to the data warehouse.

18. The method of claim 1, further comprising synchronizing the SOR document with a centralized SOR database.

19. The method of claim 1, further comprising inputting data discovery information either manually or automatically.

20. The method of claim 19, wherein the discovery information includes at least one of text, audio, images and video.

21. The method of claim 1, wherein the customized document includes at least one of text, audio, images and video.

* * * * *